United States Patent [19]
Van Andel

[11] Patent Number: 5,832,992
[45] Date of Patent: Nov. 10, 1998

[54] HEAT EXCHANGER AND METHOD FOR MANUFACTURING SAME

[75] Inventor: Eleonoor Van Andel, Fleringen, Netherlands

[73] Assignee: Fiwihex, Fleringen, Netherlands

[21] Appl. No.: 596,329

[22] PCT Filed: Aug. 19, 1994

[86] PCT No.: PCT/NL94/00198

§ 371 Date: Jun. 11, 1996

§ 102(e) Date: Jun. 11, 1996

[87] PCT Pub. No.: WO95/05570

PCT Pub. Date: Feb. 23, 1995

[30]       Foreign Application Priority Data

Aug. 19, 1993 [NL] Netherlands ............................ 9301439

[51] Int. Cl.⁶ ........................................................ F28F 7/00
[52] U.S. Cl. ............................ 165/165; 165/164; 165/88; 62/281
[58] Field of Search ..................................... 165/164, 165, 165/86, 88; 261/154; 62/281

[56]               References Cited

U.S. PATENT DOCUMENTS

| 1,648,511 | 11/1927 | Solomiac . |
| 2,893,702 | 7/1959 | Richardson .............................. 257/245 |
| 3,046,639 | 7/1962 | Freyholdt ............................. 165/165 X |
| 3,103,971 | 9/1963 | Freyholdt ................................ 165/165 |
| 4,098,852 | 7/1978 | Christen et al. ......................... 261/104 |
| 4,116,271 | 9/1978 | De Lepeleire .......................... 165/166 |
| 4,513,577 | 4/1985 | Wilson et al. ............................. 62/91 |
| 4,840,228 | 6/1989 | Shaner ................................... 165/165 |
| 5,271,459 | 12/1993 | Daschmann ............................. 165/166 |
| 5,655,600 | 8/1997 | Dewar et al. ............................ 165/166 |

FOREIGN PATENT DOCUMENTS

| 793344 | 1/1936 | France . |
| 889916 | 1/1944 | France .................................... 165/166 |
| 893038 | 5/1944 | France . |
| 1183990 | 7/1959 | France . |
| 2429988 | 1/1980 | France . |
| 3328997 | 2/1985 | Germany . |
| 54-145048 | 11/1979 | Japan ..................................... 261/154 |
| 1376303 | 12/1974 | United Kingdom . |

OTHER PUBLICATIONS

Japanese Publication No. JP 61–225585, published Oct. 7, 1986. Patent Abstracts of Japan, 1 page.

*Primary Examiner*—Allen J. Flanigan
*Attorney, Agent, or Firm*—Webb Ziesenheim Bruening Logsdon Orkin & Hanson, P.C.

[57]               ABSTRACT

A heat exchanger which includes a first space through which a first medium can flow along a first path; a second space through which a second medium can flow along a second path; and heat conducting means which are in thermal contact with the first medium in the first space and the second medium in the second space for transferring heat therebetween; which heat conducting means includes heat conducting wires which extend from the first space and the second space with mutual interspacing and in mutually parallel relation in a direction differing from the directions of the first and second path over at least a part of both transverse dimensions relative to the paths, and has the characteristic that the wires are arranged in flat strips or mats which are placed such that at least one of the media flows first between the strips or mats and then through the strips or mats and between the wires with heat exchange between that medium and the wires.

28 Claims, 13 Drawing Sheets

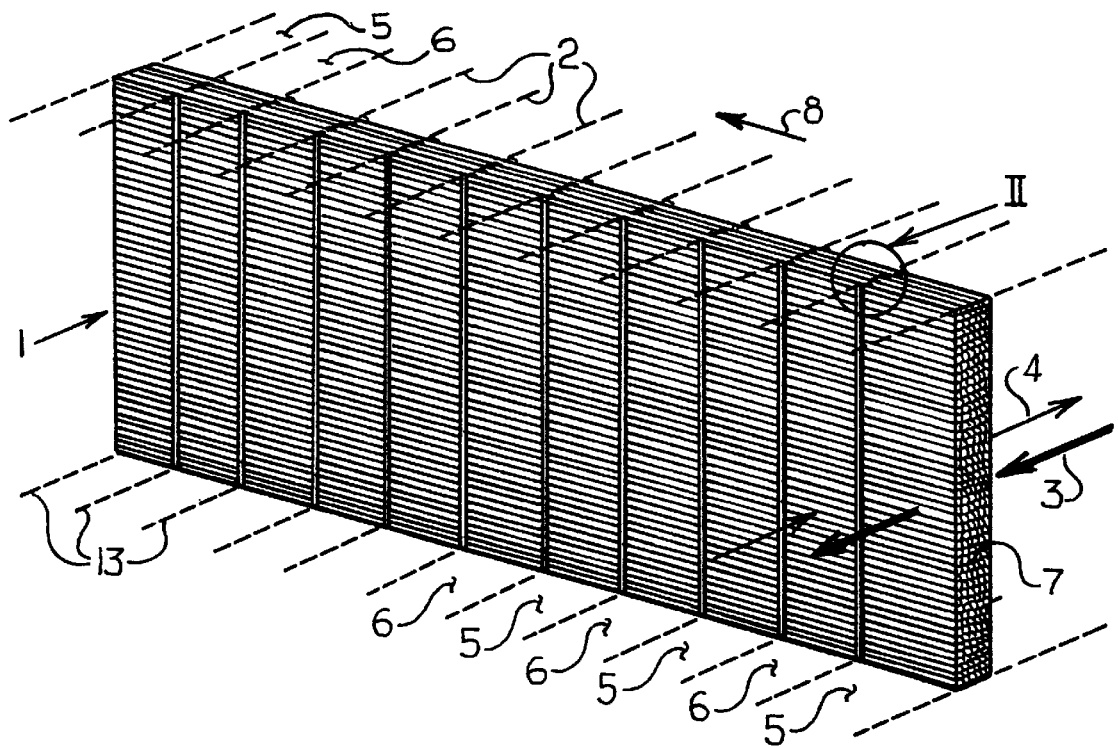
FIG. 1
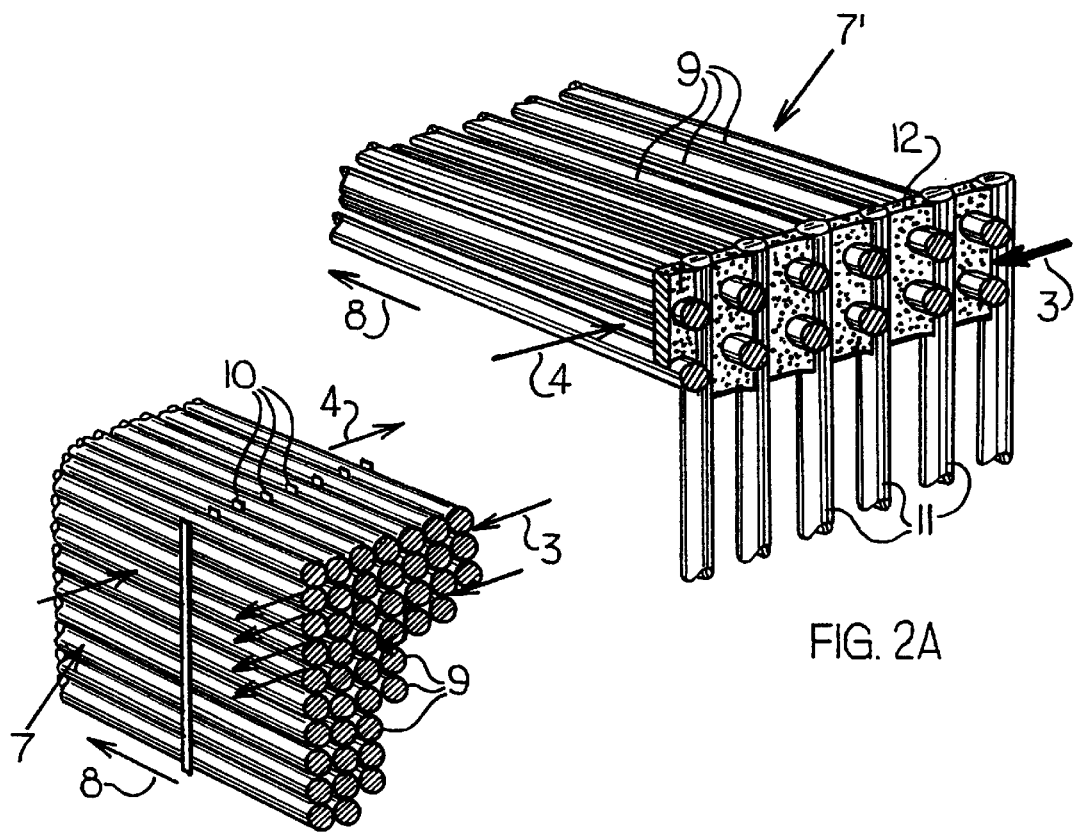
FIG. 2A
FIG. 2

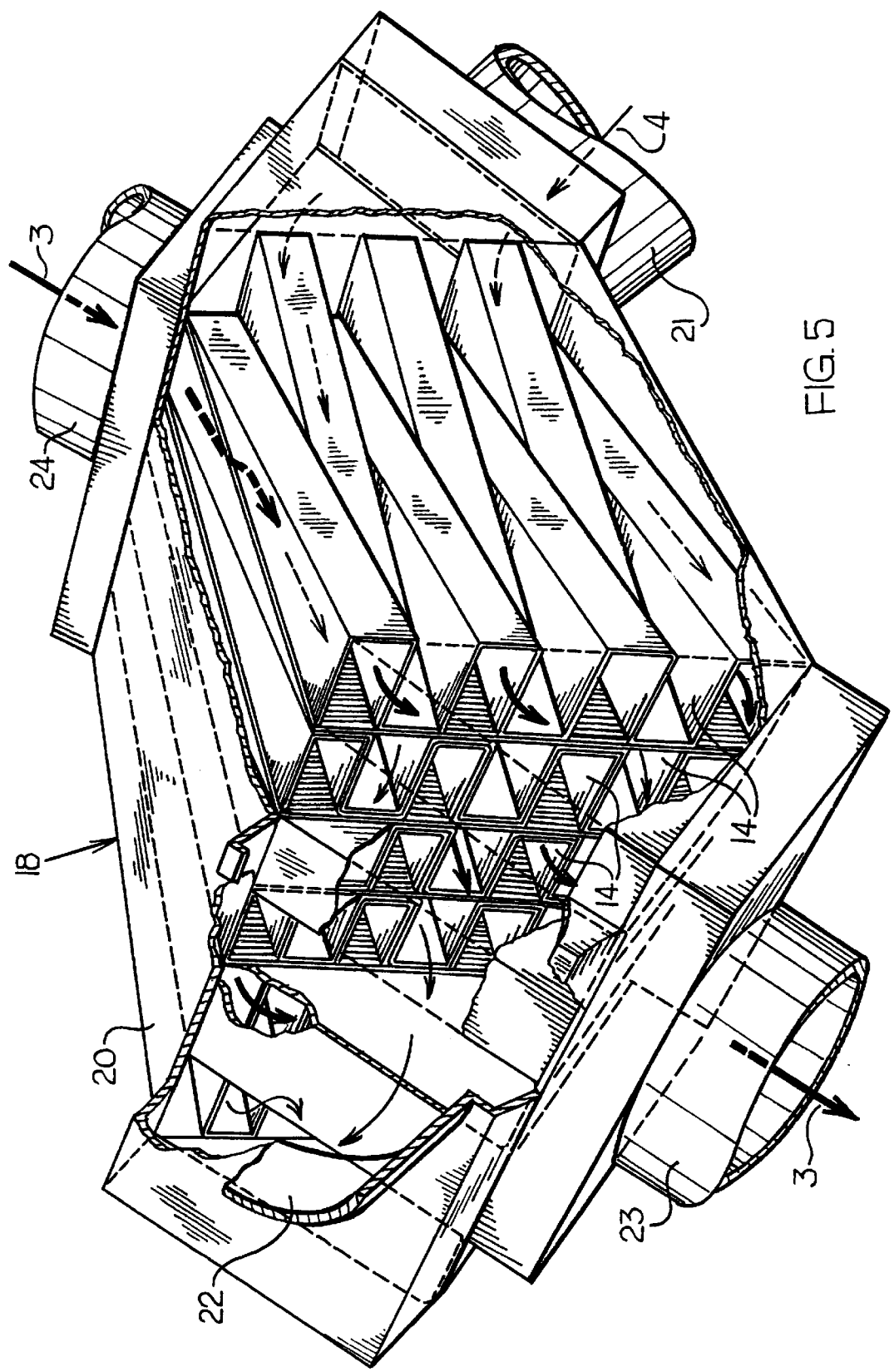

HEAT EXCHANGER AND METHOD FOR MANUFACTURING SAME

BACKGROUND OF THE INVENTION

1. Field of the Invention

The invention relates to a heat exchanger including:

a first space through which a first medium can flow along a first path;

a second space through which a second medium can flow along a second path; and heat conducting means which are in thermal contact with the first medium in the first space and the second medium in the second space for transferring heat therebetween, in which heat conducting means includes heat conducting wires which extend from the first space and the second space with mutual interspacing and in mutually parallel relation in a direction differing from the directions of the first and second path over at least a part of both transverse dimensions, relative to the said paths.

2. Background of the Prior Art

Such a heat exchanger is known from the French patent specification FR-A-1 183 990.

SUMMARY OF THE INVENTION

The object of the invention is to provide a heat exchanger which enables a high flow rate per unit of volume, causes a small pressure fall, has a high efficiency and allows of simple mass production at low cost.

With a view hereto the invention generally provides a heat exchanger of the type which has the feature that the wires are arranged in flat strips or mats which are placed such that at least one of the media flows first between the strips or mats and then through the strips or mats and between the wires with heat exchange between that medium and the wires; and the pitch of the heat conducting wires amounts to 1,5–2,5 times the wire diameter.

In preference the pitch of the heat conducting wires amounts to substantially twice the wire diameter.

The heat exchanger is preferably embodied such that the free length of the wires corresponding with the transverse dimension of the path of at least one of the media amounts to (6±2) mm.

Economically the most attractive is a heat exchanger which has the special feature that the diameter of the heat conducting wires is chosen such that the product of the price of the wires per kg and the wire diameter to the power 1.5 is not larger than 3 times the minimum value of that product.

The heat exchanger can have the feature that the heat conducting wires at least substantially consist of copper, aluminium, graphitized carbon fibres or another material conducting the heat well at least in lengthwise direction of the wires. Graphitized carbon fibres have a high thermal conduction coefficient in longitudinal direction but have the drawback of being relatively brittle and expensive. For the time being at any rate the use of copper or aluminium is in all probability to be preferred from economic considerations.

In this latter context an embodiment is recommended wherein the heat conducting wires substantially consist of copper or aluminium and have a diameter which is smaller than 0.25 mm, preferably 0.1 mm or smaller.

One of the types of heat exchanger has the feature that the two media flow through the heat-exchanger in counterflow;

the two spaces are separated by a dividing wall including a number of spacer wires which hold the heat conducting wires at mutual distances and which are joined mutually and to the heat conducting wires by an adhesive and filler mass and are arranged such that they do not obstruct through-flow of medium or do so only to a negligible extent;

the first space and the second space respectively include a number of first compartments ordered with mutual interspaces and a number of second compartments filling the said interspaces between the first compartments, wherein the heat conducting wires extend over the whole of the relevant dimension of the heat exchanger, the heat conducting wires are grouped with the spacer wires to an elongate mat and extend in longitudinal direction thereof, the first compartments occupy a first position relative to the main plane of the mat such that the first path extends transversely of the heat conducting wires;

the second compartments occupy a second position relative to the main plane of the mat such that the second path extends transversely of the heat conducting wires;

extending on the one side of the mat is a first zigzag folded plate which forms the relevant boundaries of the first and the second compartments;

extending on the other side of the mat is a second zigzag folded plate which forms the relevant boundaries of the first and the second compartments; and that the boundaries formed by the two plates form together with the said dividing walls the side boundary walls of the compartments.

The heat exchanger according to the invention is preferably used such that the two media in adjacent compartments of the mat are in counterflow to each other so that the efficiency of heat exchanging can be increased to an economically correct level by making the mat thicker in the direction of the flows.

In another embodiment the heat exchanger according to the invention can have the feature that the adhesive and filler mass are a solder mass.

It will be apparent that the adhesive and filler mass can consist wholly of glue or a solder mass. As alternative can be considered pre-fabricated filler elements which are held sealingly in place by the glue or the solder mass.

In a particular embodiment the heat exchanger has the feature that the adhesive and filler mass are a glue. In a practical embodiment of the heat exchanger the glue can be applied to the spacer wires. These spacer wires, which can be for instance of nylon, are guided through an applying station for the glue. The glue, which for this purpose preferably has a pseudo-plastic character, allows of application as a layer round the nylon wire and does not draw together to droplets.

This latter embodiment can advantageously have the special characteristic that the spacer wires have the same diameter as the heat conducting wires.

This heat exchanger can for instance have the feature that the first position and the second position are symmetrical relative to the main plane of the mat.

Very simple and inexpensive to manufacture is a variant wherein the plates are formed from a straight strip of plate material, for instance by folding or thermoforming from polymer film.

A particular embodiment has the special feature that each compartment has a section perpendicularly of the main plane of the mat having the general shape of a quadrilateral of which the mat is a diagonal.

Very important is an embodiment wherein the plates are folded such that they are nestable with the plates of a similar heat exchanger. Such a heat exchanger allows of very easy coupling to a similar heat exchanger so that a composite heat exchanger of practically any desired dimension can be obtained. This modular construction enables a very great production flexibility.

The above stated embodiment in which the mat is a diagonal of a quadrilateral can advantageously display the special characteristic that each path forms an angle with the mat, the tangent of which amounts to at least roughly 0.2.

An easy condensation discharge is ensured with a variant wherein on at least one of the spaces a fibrous second mat connects to the mat of heat conducting wires, which fibrous second mat serves to draw off condensation by capillary action from the underside of the mat of heat conducting wires.

A particular variant has the feature that the mat is manufactured by placing alternatingly one on the other a layer of heat conducting wires and a layer of spacer wires. Such a heat exchanger is easy to produce.

In this embodiment the number of heat conducting layers preferably amounts to between five and ten. This corresponds with an economic optimum of four heat transfer units or "discs" at an in-out temperature difference of 10° C. and counterflow of the two media.

Particularly the embodiment having the feature that the mat is manufactured by winding heat conducting wires is easy and inexpensive to produce.

A specific embodiment has the special feature that the dividing wall has a certain moisture-permeability.

An embodiment in which the temperatures remain limited to a certain maximum value, for instance 80° to 100°, can advantageously have the characteristic that the plates are plastic.

For higher temperatures the heat exchanger can have the special feature that the plates consist of aluminium. It will be apparent that other materials may in principle also be suitable.

A specific embodiment has the feature that the width of each of the first and/or second compartments has a value which is proportional to the diameter of the heat conducting wires and the root of their thermal conductivity, for instance:

|  | diameter | width |
| --- | --- | --- |
| Copper wire | 0.1 mm | 6 mm |
|  | 0.05 mm | 3 mm |
| Aluminium wire | 0.1 mm | 4.5 mm |
|  | 0.05 mm | 2.3 mm |

A very attractive variant is that in which the heat exchanger forms part of a rotor drivable by a motor such that two functions are combined, namely pumping of two media and the exchange of heat therebetween. This heat exchanger combines the two said functions and is thereby very compact and also inexpensive to construct. It is also noted that in the case of a rotatably driven heat exchanger the discharge of condensation or other moisture can take place easily due to centrifugal forces.

This latter described variant can advantageously have the feature that the motor is an "Aussenlaufer" motor and is centrally arranged in the rotor.

In preference the heat exchanger according to the invention is dimensioned such that the effective passages of the two spaces correspond with determined physical properties of the two media, in particular $c_p$, the heat capacity at constant pressure.

The invention also relates to a method for manufacturing a heat exchanger of the type specified in claim 11. This method according to the invention includes the steps of:

(1) providing a strip which carries on both its longitudinal sides transverse protrusions, for instance pins, which are located pair-wise at the sane longitudinal positions, which pairs have preselected mutual distances, for example equal distances, or alternately the one and the other with two different distances;

(2) providing a first zigzag folded plate with transverse zones having the same pitches as the protrusions, the transverse dimensions of which first plate correspond with the distance between the two rows of protrusions;

(3) placing the plate between the protrusions such that the transverse zones thereof lie in register with the protrusions;

(4) providing heat conducting wires;

(5) providing spacer wires;

(6) arranging alternately a layer of mutually spaced heat conducting wires, which extend in lengthwise direction of the plate, and a layer of mutually spaced spacer wires which are trained zigzag over the protrusions such that they display transversely extending zones having pitches corresponding with the pairs of protrusions, wherein at least at the position of the intersections of the heat conducting wires and the spacer wires and at the position of the transverse zones of the plate an adhesive and filler mass is arranged;

(7) providing a second zigzag folded plate with transverse zones having the same pitches as the protrusions, the transverse dimensions of which second plate correspond with the distance between the two rows of protrusions;

(8) arranging the second plate against the last arranged layer of wires in register with the first plate and the transverse zones of the spacer wires, wherein at least at the position of the transverse zones of the second plate an adhesive and filler mass is arranged;

(9) causing the adhesive and filler mass to be cured if necessary in order to obtain the coupling between the heat conducting wires, the spacer wires and the first and the second plate and to form the dividing walls; and

(10) removing the thus formed heat exchanger from the protrusions transversely of the strip.

Simplest is the embodiment which comprises the step of:

(11) performing step (1) such that the strip is drivable in circular and rotating manner to arrange the heat conducting wires by winding.

Another embodiment within the basic principle of the invention is characterized by a number of heat conducting capillaries which are disposed substantially parallel to each other at least along significant parts of their free lengths, which capillaries are connected with their ends to respectively a common feed and a common outlet for evaporating or condensing liquid, wherein the heat conducting wires are preferably wound or woven in a single layer round two groups, for instance rows, of capillaries and are thermally coupled thereto, for example are fixedly soldered thereon.

This heat exchanger preferably has the feature that the capillaries have an outer diameter of (0.5±0.2) and a wall thickness of 0.1–0.2 mm.

BRIEF DESCRIPTION OF THE DRAWINGS

The invention will now be elucidated with reference to the annexed drawings, wherein:

FIG. 1 shows a highly simplified and schematic perspective view of a heat exchanger;

FIG. 2 shows the detail II of FIG. 1 on larger scale;

FIG. 2a is a view corresponding with FIG. 2 of a preferred embodiment;

FIG. 5 shows a heat exchanger unit with a number of nested heat exchanger modules;

DESCRIPTION OF THE PREFERRED EMBODIMENT

Figure 4:
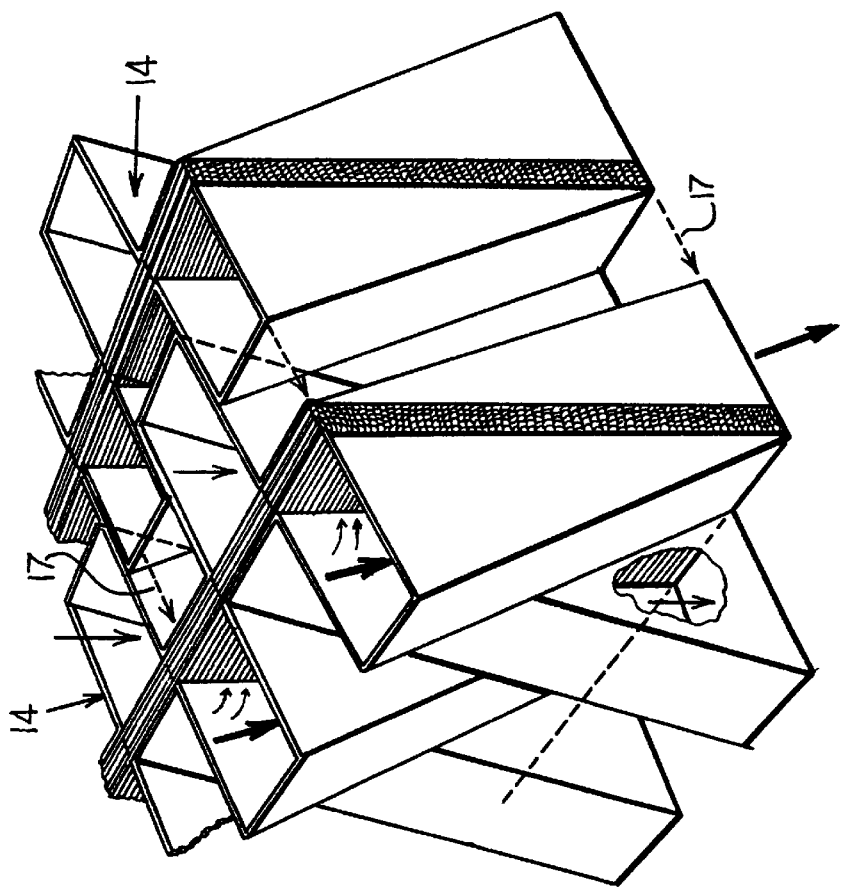
FIG. 4 shows a view corresponding with FIG. 3 of two nested heat exchangers, from which can be seen-that the basic embodiment of FIG. 3 can be assembled in modular manner to a heat exchanger unit of any desired size.

FIG. 1 shows a heat exchanger 1. This includes a number of schematically shown dividing walls 2 which are located at a mutual distance of preferably about 6 mm and which form compartments through which two media 3, 4 can flow. Heat exchanging contact between the alternating compartments 5, 6 takes place via a mat 7 consisting of heat conducting wires, for instance of copper, which extend in lengthwise direction 8 and which are held at a mutual distance by means of spacer wires.

FIG. 2 shows that the heat conducting copper wires 9 are located at a vertical distance from each other such that the medium flows 3, 4 are not impeded or are only impeded to a negligible extent. Nylon spacer wires 10 hold at a mutual distance the layers of wires 9 extending in vertical planes so that the regular cross sectional structure of the mat 7 shown in FIG. 2 is obtained. The copper heat conducting wires 9 and the nylon spacer wires 10 are mutually joined by means of an adhesive mass.

FIG. 2a shows a preferred embodiment, wherein the spacer wires 11 have the sane diameter as the heat conducting wires 9. Also drawn in this figure is the adhesive and filler mass 12 which fulfills the function of the dividing walls at the position of the dividing walls between the compartments 5 and 6 in the region of the mat 7. In most embodiments of the heat exchanger according to the invention the dividing walls 13, which are only designated schematically in FIG. 1, connect in medium-tight manner onto the dividing wall zones formed by the adhesive and filler mass.

Figure 3:
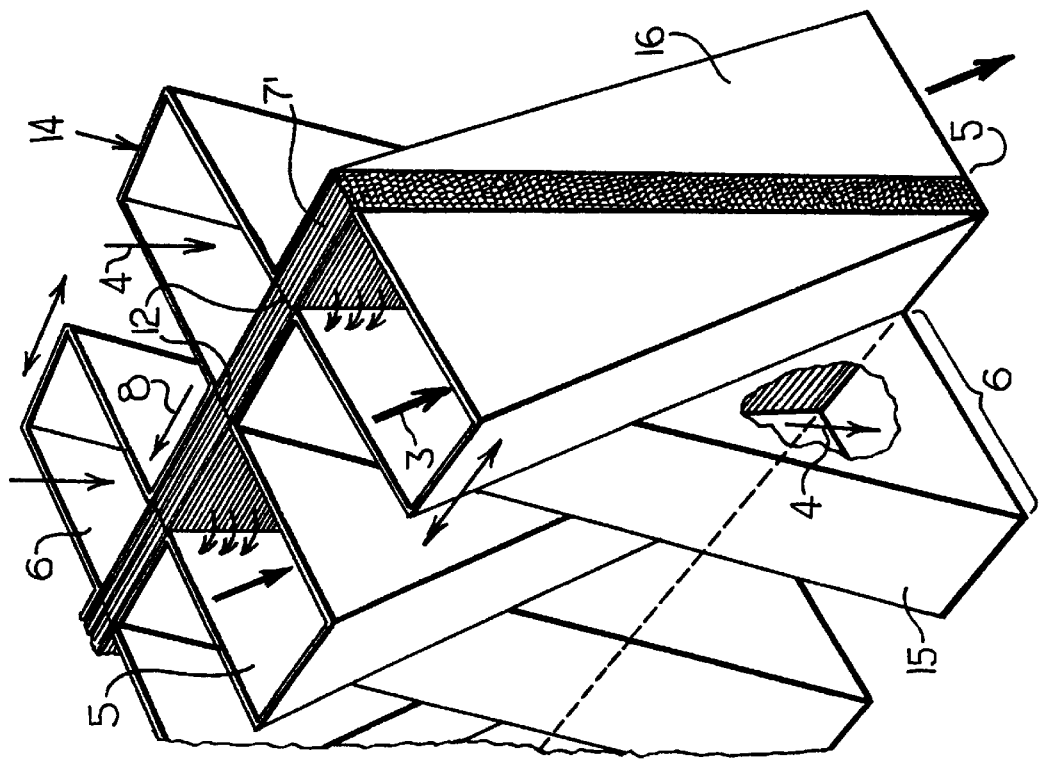
FIG. 3 is a partly broken away perspective view of a basic embodiment.

It is noted that in FIGS. 1, 2 and 3 the medium flows 3 and 4 are drawn in opposing directions. It will however be apparent that this is only by way of example and that other directions are also possible, as will become apparent inter alia with reference to the FIG. 3 to be discussed below.

FIG. 3 shows the basic principle of a preferred embodiment of the heat exchanger according to the invention.

The basis of the heat exchanger 14 according to FIG. 3 is the mat 71 of FIG. 2a conducting heat in lengthwise direction.

The compartments 5 and 6 are embodied in the manner shown in FIG. 3 as block-shaped structures which are placed at an angle relative to the plane of the mat 7' and in which the mat 7' is placed diagonally. On either side of mat 7' are arranged zigzag folded plates 15, 16. These are each folded from a flat rectangular strip.

FIG. 4 shows that two of the heat exchangers 14 can be pushed into one another as according to arrows 17. In this way a modular assembly heat exchanger unit consisting of heat exchangers 14 can be manufactured with any desired size. As shown by the flow arrows in FIG. 4, for example, the wires are preferably arranged in flat strips or mats which are placed such that at least one of the media flows first between the strips or the mats and then through the strips or mats and between the wires, with heat exchange between the medium and the wires.

FIG. 5 shows such a structure. The heat exchanger unit 18 comprises a number of heat exchangers 14 according to FIG. 4 in nested position. These are enclosed by a housing 20 with a feed 21 for the medium flow 4, an outlet 22 for the medium flow 4, a feed 24 for the medium flow 3 and an outlet 23 for the medium flow 3. The feeds and outlets for media 2 and 3 are mutually separated in the manner shown schematically in FIG. 5 such that the media 3 and 4 are only in mutual heat exchanging contact.

Figure 6:
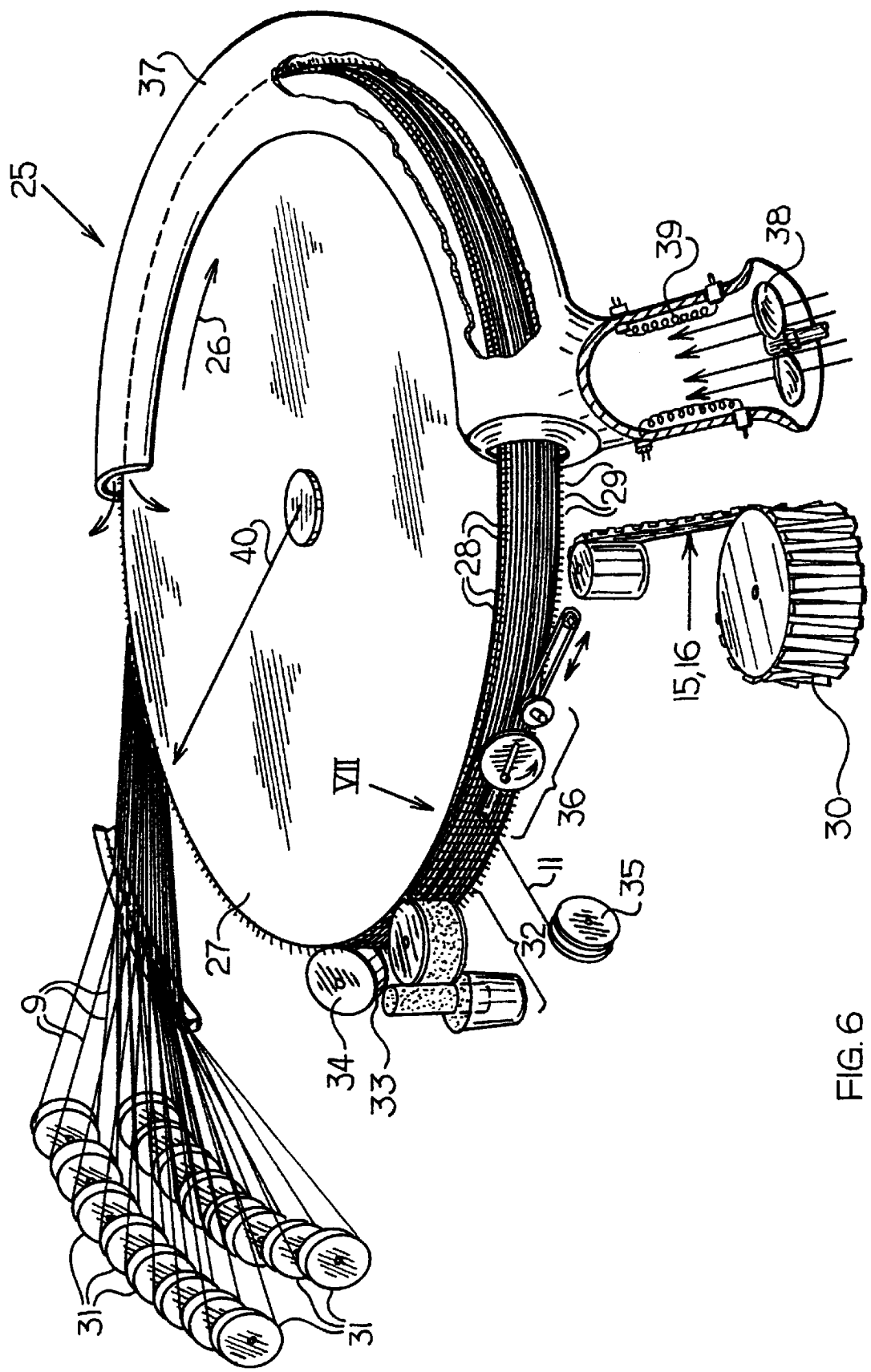
FIG. 6 shows a schematic perspective view of an apparatus using which a heat exchanger according to FIG. 3 can be manufactured.

FIG. 6 shows schematically an apparatus 25 with which a heat exchanger of the type shown in FIG. 3 can be manufactured. A wheel 27 rotatably drivable as according to arrow 26 by means of drive means (not shown) carries on its outer side a strip bearing pairs of pins 28, 29 placed at mutually equal angular distances. The pins 28 extend on the upper side while pins 29 extend on the underside.

Figure 7:
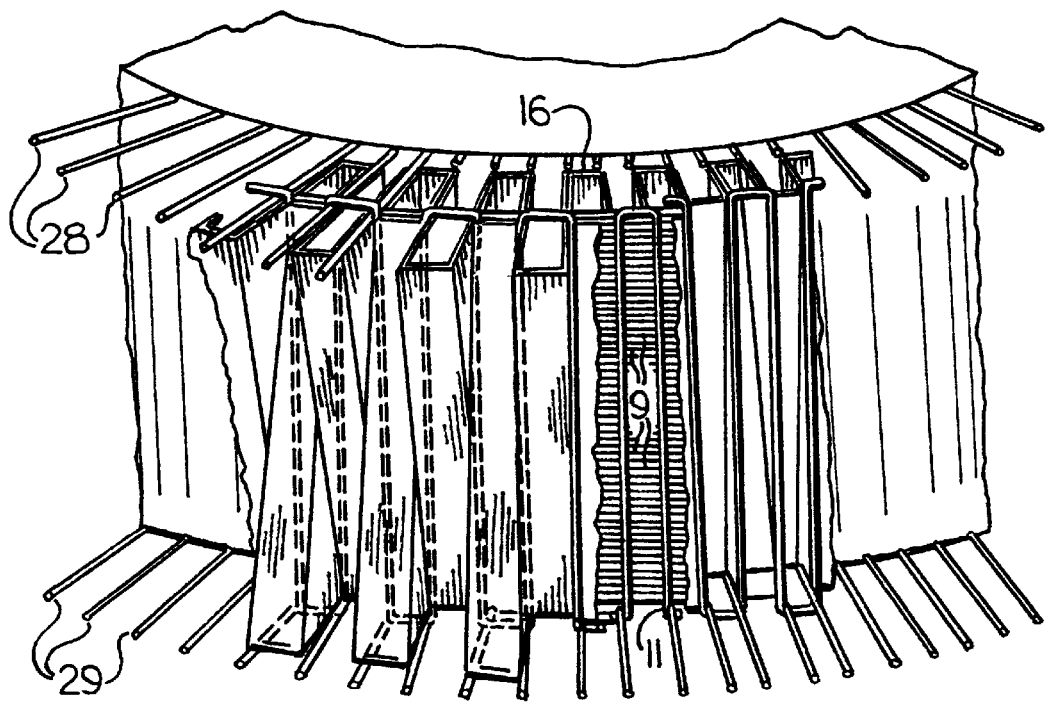
FIG. 7 shows the detail VII of FIG. 6 on larger scale.

FIG. 7 shows various components in more detail.

In order to manufacture the heat exchanger 14 the plate 16 pre-folded in zigzag form, is first placed in the manner indicated such that the zigzag structure is precisely registered with the mutual distance between the pins 28, 29.

Alternating layers of heat conducting wires 9 and spacer wires 11 are then arranged such that the mat structure shown in FIG. 2a is obtained. As FIG. 7 shows, the spacer wires 11 are always trained round the pins 28, 29 such that the vertically extending zones fulfill the actual function of spacer wires. For the desired adhesion between plate 16, the heat conducting wires 9 and the spacer wires 11 use is made of a pseudo-plastic glue which can be cured by heating.

FIG. 6 shows schematically that the plate 16 is arranged on wheel 27 from a stock roll 30. The heat conducting wires are supplied to the wheel 27 from supply reels 31 which are arranged free-rotating and for instance with a light braking force. By means of suitable guiding means they are arranged such that the structure with mutual interspacing as according to FIG. 2a is obtained. By means of a glue application station 32 the outer layer is continuously provided with a glue layer. Two pressure wheels 33, 34 press the outer edges in the direction of the pins 28, 29. The vertical layers formed by winding the heat conducting wires 9 are alternated with the layers of spacer wires 11 which are shown in FIG. 7. These are arranged by unwinding the wire from a stock reel 35 and by training it in reciprocal movement by means of a guiding device 36 such that the wire is continuously guided with reciprocal movement in the manner shown in FIG. 7 over two pins 28, 29 respectively shifted through one pitch distance.

A tunnel 37 extends over a part of the periphery of wheel 27. This tunnel serves to cure the applied glue by heating. For this purpose a fan 38 with heating elements 39 connects to the tunnel.

In one continuous operation a heat exchanger can be manufactured in the manner described by a desired number of revolutions of the wheel 27, which heat exchanger has a desired number of layers of the heat conducting wires 9 corresponding with the number of revolutions.

Figure 8:
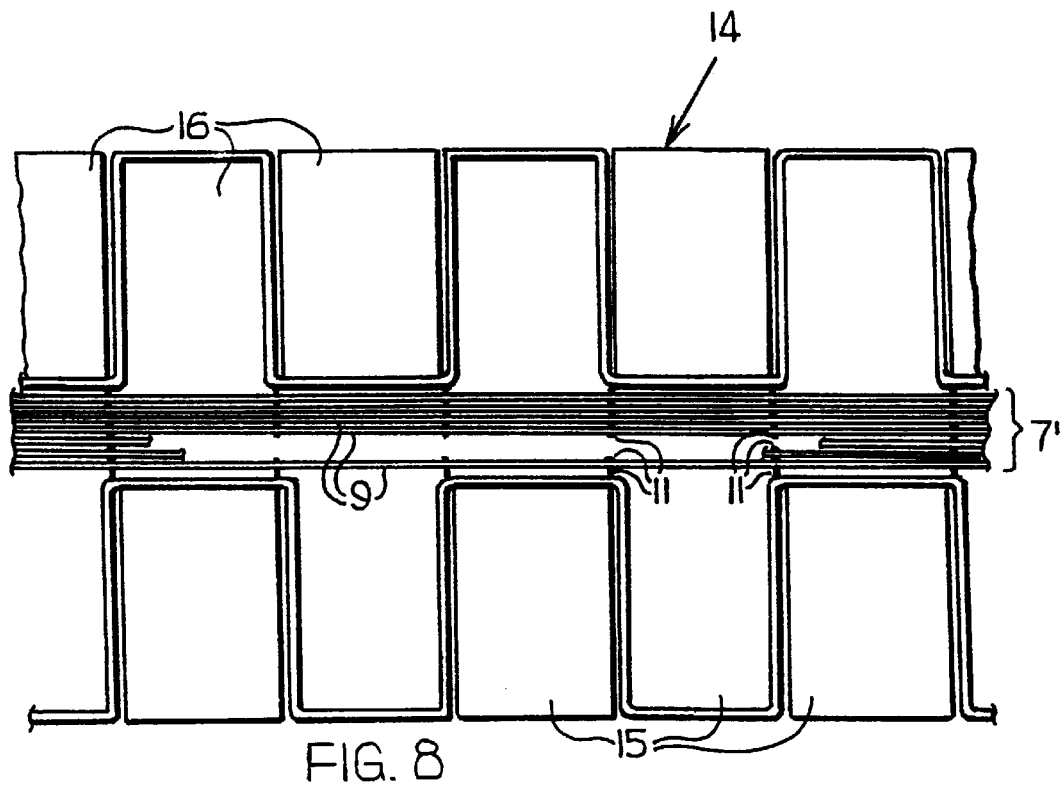
FIG. 8 shows a top view of a detail on enlarged scale of the heat exchanger according to FIG. 7.

FIGS. 7 and 8 show that after completion of the thirteen layers of mat 7' on the outside the plate 15 is placed with interposing of the glue. After the heat exchanger is thus completed it can be removed from the wheel 27 by being slid radially outward along the pins 28, 29.

FIG. 6 shows that the stock roll 30 carries both plate 15 and plate 16. These plates are in any case identical and can therefore be taken off the same roll, or manufactured on site by a production device. As a result of the slight curving of the wires 9 a (very slight) curving of the heat exchanger will remain. By selecting a sufficiently large radius of curvature 40 of wheel 27 this curving will be totally negligible in practical conditions.

Figure 9:
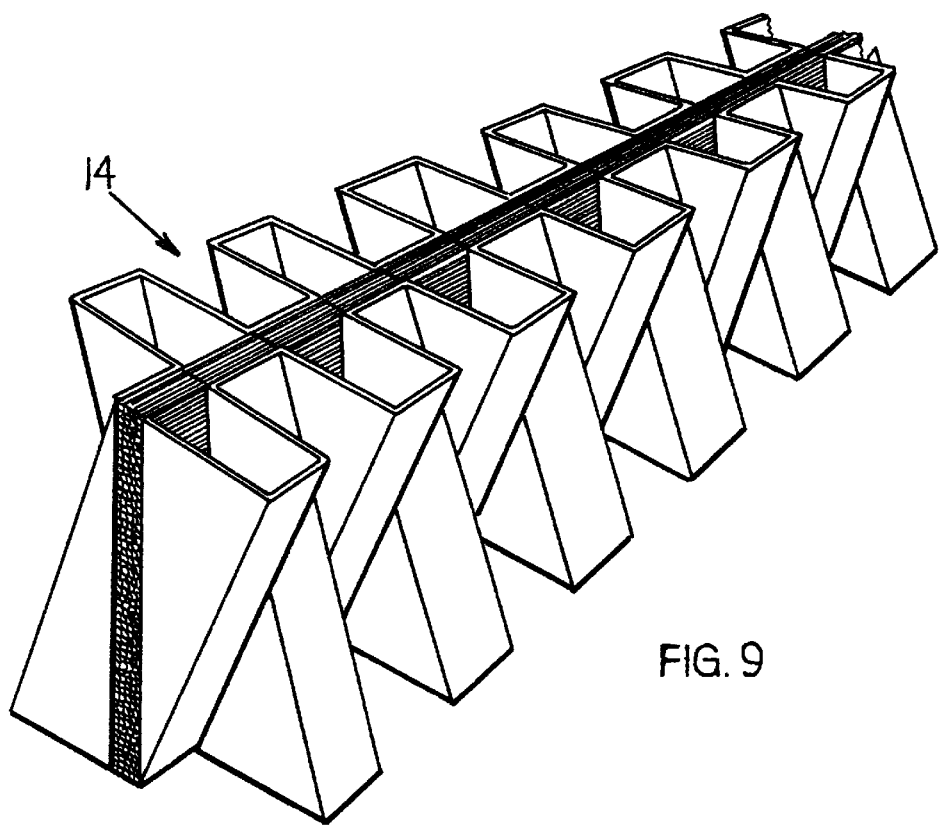
FIG. 9 is a perspective view of a finished heat exchanger on the basis of the basic embodiment according to FIG. 3.

FIG. 9 shows the finished heat exchanger based on the principle shown in FIG. 3.

Figure 10:
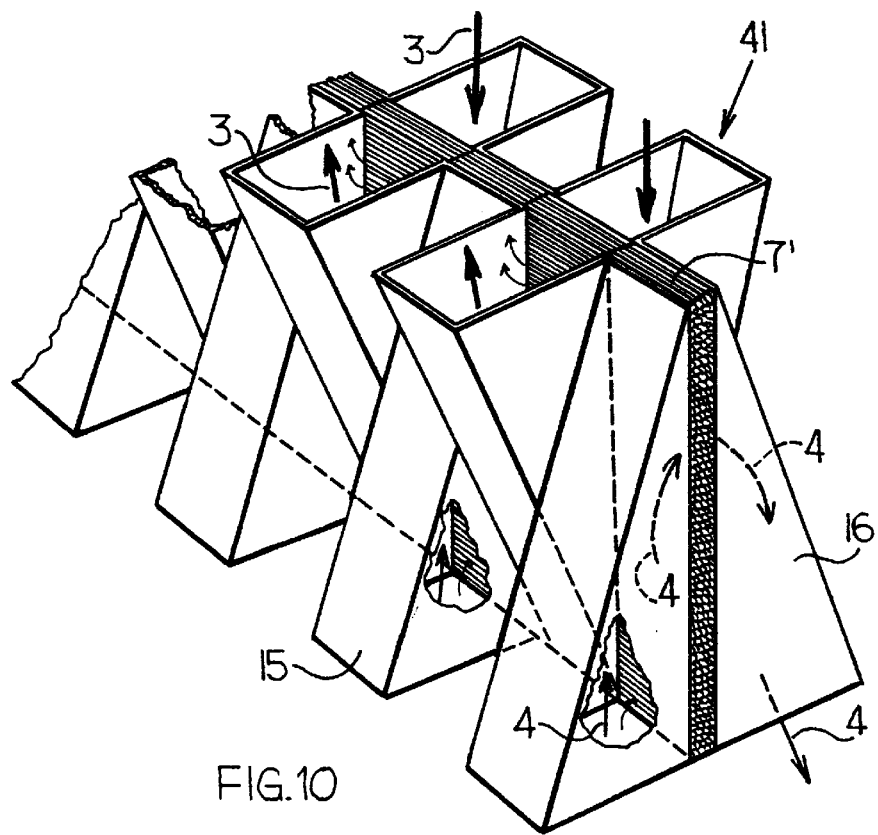
FIG. 10 is a partly broken away perspective view of an alternative which is also nestable.

FIG. 10 shows a heat exchanger 41 wherein the compartments do not take the form of a block but the form of isosceles triangles in which the mat 7' forms the perpendicular from the apex. As FIG. 10 clearly shows, the medium flow 3, 4, other than as drawn in FIG. 3, does not flow more or less straight but is routed via a bend. It is noted that the plates 15, 16 are identical to those plates according to FIG. 3, but are shifted through half a pitch distance, relative to FIG. 3. This structure is also nestable.

Figure 11:
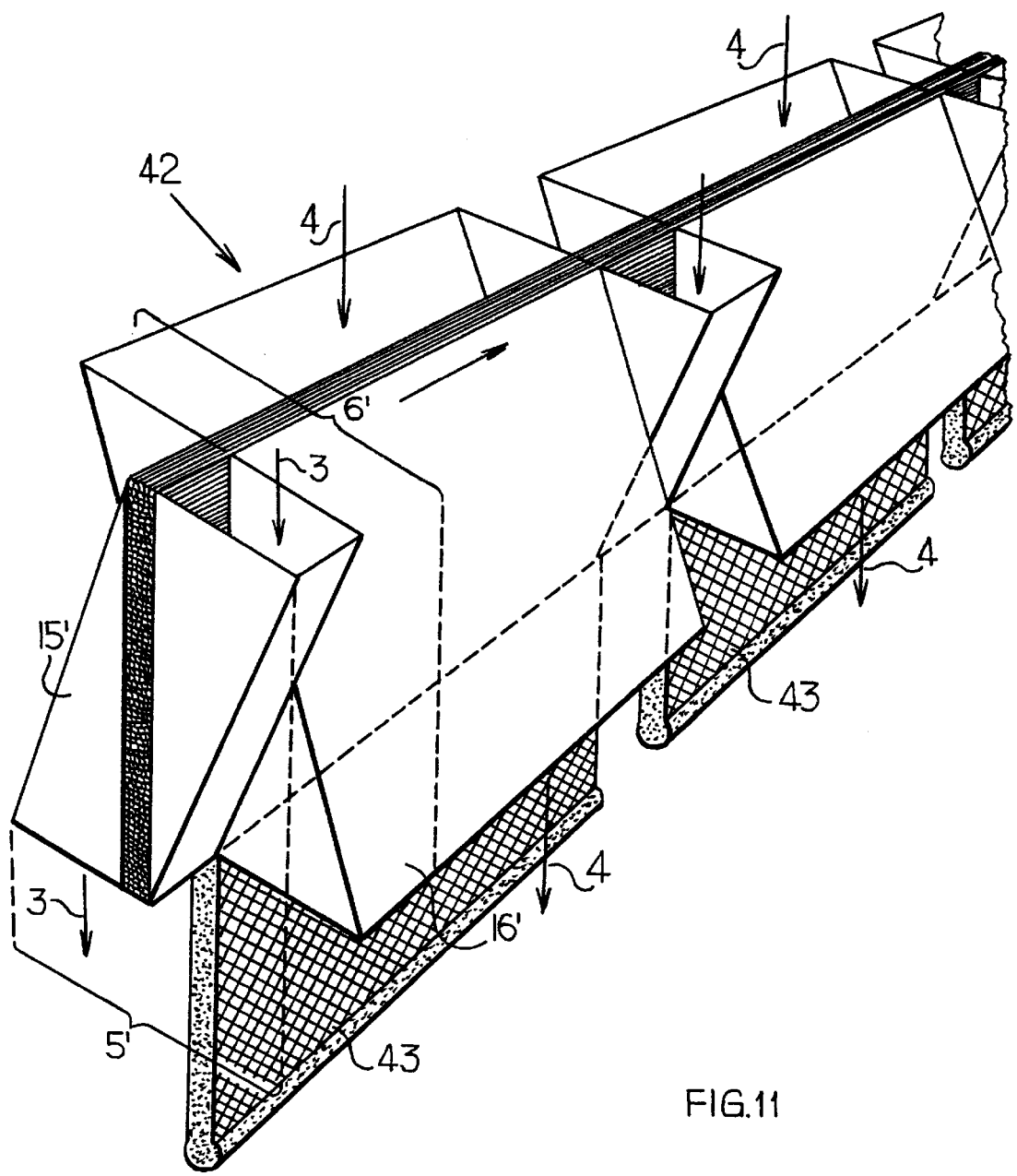
FIG. 11 is a perspective view of yet another embodiment which is particularly suitable for heat exchanging between a gaseous and a liquid medium and is provided with condensation outlet, for instance for air conditioning installations.

FIG. 11 shows a heat exchanger 42 which differs from the heat exchanger 14 of FIGS. 3 and 9 in the sense that the compartments for the medium flow 4 have an enlarged dimension in the longitudinal direction 8. This dimensioning is chosen with a view to the $c_p$ of the medium 4. The form of the plates, in this case designated as 15' and 16', is in accordance herewith. It will be apparent that an apparatus for manufacturing such a heat exchanger must be adapted accordingly. The pins 28, 29 must have adapted mutual spacings and the guiding device must guide the wire 11 in corresponding manner.

Attention is drawn to the fibrous mats or "wicks" 43 extending on the underside of the wide compartments 6'. These serve to discharge condensation out of the heat exchanger 42.

Figure 12:
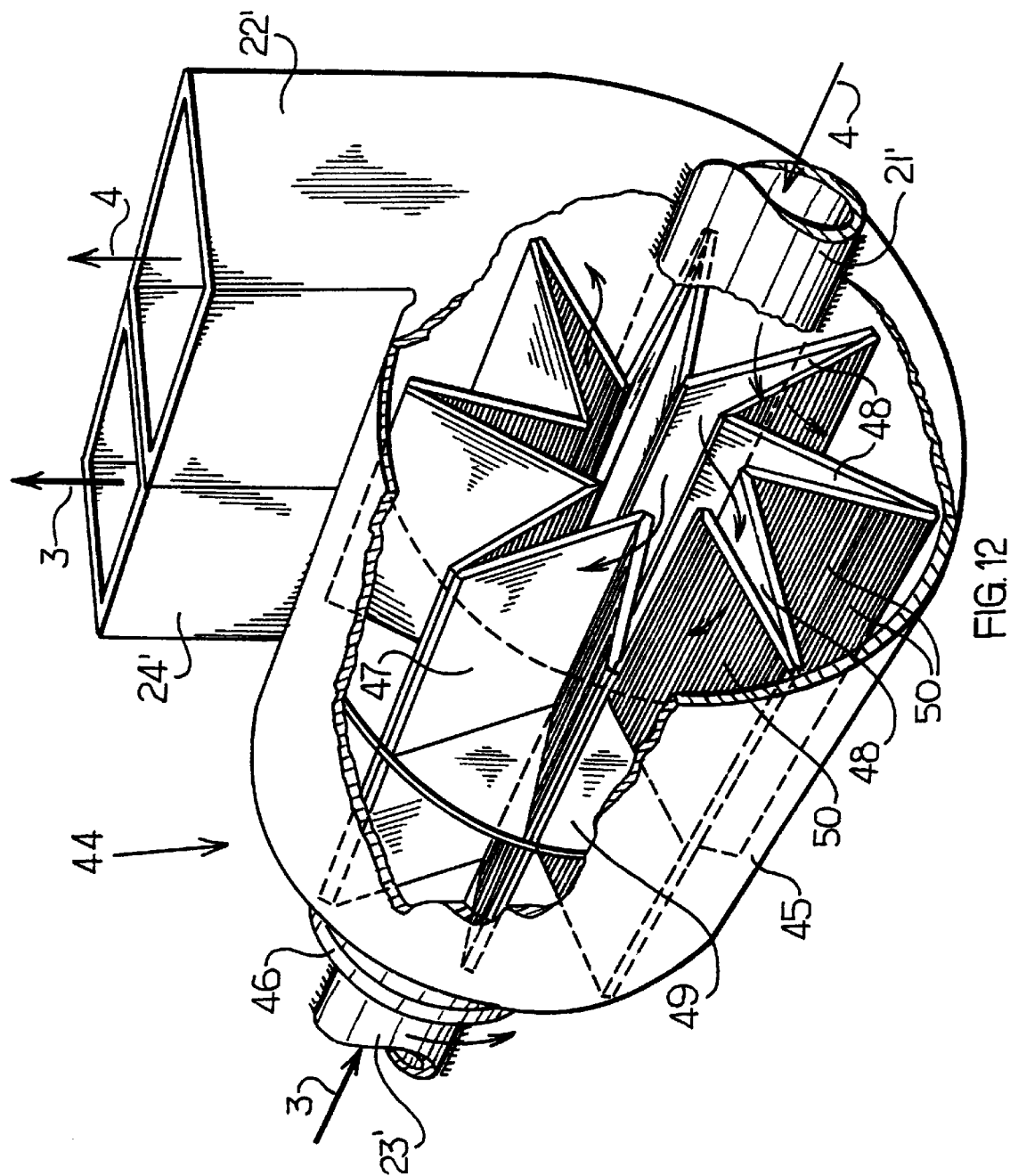
FIG. 12 is a partly broken away perspective view of a rotatably drivable heat exchanger in a first simple embodiment.

FIG. 12 shows a device 44 according to the invention which combines two functions, namely pumping of the media 3 and 4 and the exchange of heat therebetween.

To this end the device 44 comprises a housing 45 with a feed 23' for the medium 3, an outlet 24' for the medium 3, a feed 21' for the medium 4 and an outlet 22' for the medium 4. Received in the housing is a rotor 47 rotatably drivable by means of a gear rim 46 and comprising eight blades 48 which in this case are mutually joined about halfway by means of a dividing wall 49. The blades comprise heat conducting wires 50 extending in axial direction which are assembled to a mat in the manner described extensively above. The dividing wall 49 connects in substantially medium-tight manner onto the inner surface of housing 45.

The device 44 is based on the principle of the centrifugal pump. Medium 3, 4 is drawn in axially by driving the rotor with the eight blades grouped together in a star-shape and discharged via the outlets 22', 24' known from centrifugal pumps and connecting more or less tangentially to the cylindrical space of the housing 45. The media 3, 4 are thus urged to displace through the walls of the blades 48 in accordance with the principle outlined for instance in FIG. 1. The heat conducting wires are thus able to transfer heat from the one medium to the other.

Figure 13:
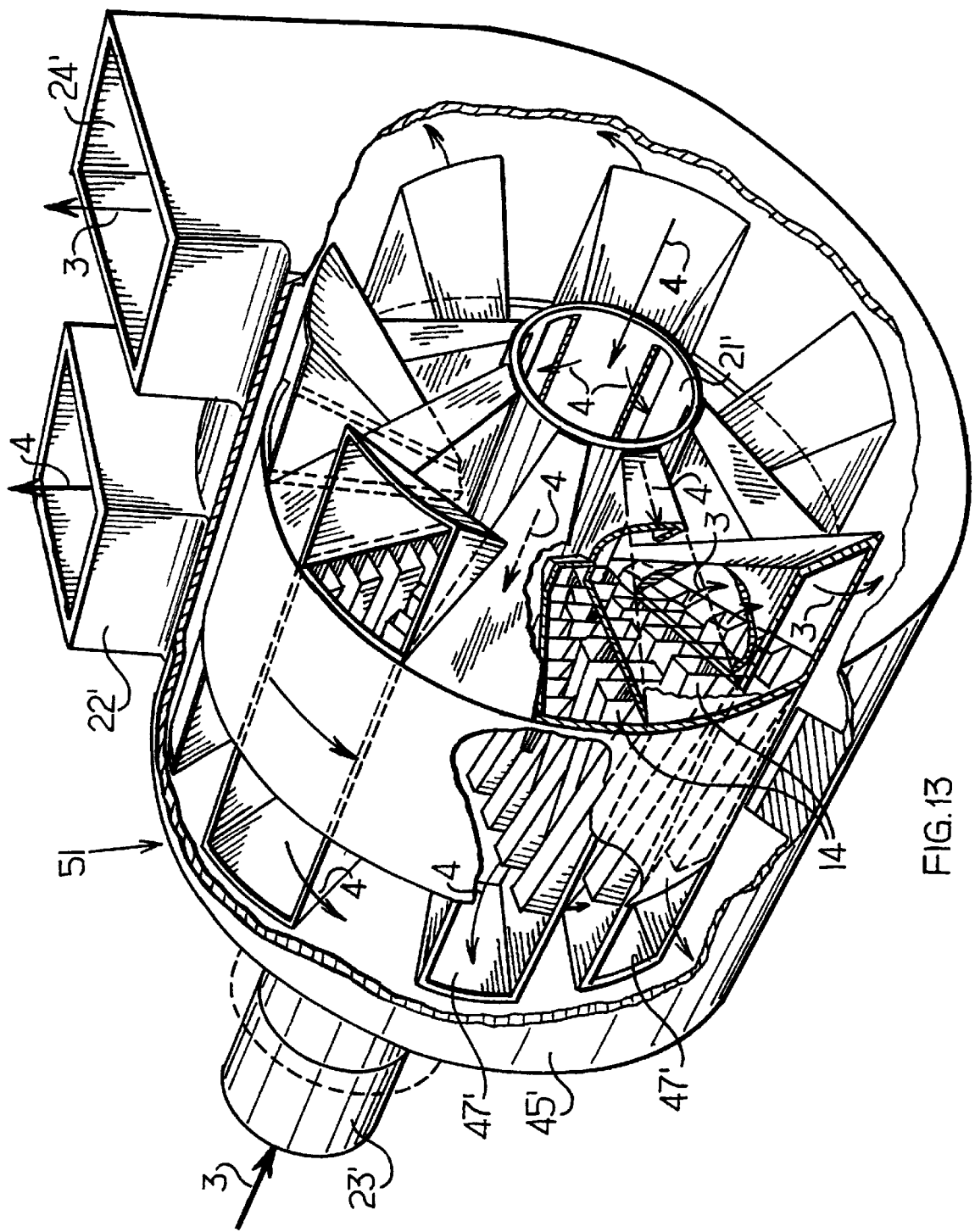
FIG. 13 is a partly broken away perspective view of a more refined embodiment of a rotatable heat exchanger cum medium pump according to the invention.

FIG. 13 shows a refined embodiment of such a pump cum heat exchanger. Otherwise than in the embodiment of FIG. 12 the device 51 according to FIG. 13 is based on the use of a number of heat exchangers 14 according to FIGS. 3 and 9. It is noted that components in FIG. 13 corresponding with components in FIG. 12 are designated with the same reference numerals as therein. Functionally corresponding components are, where necessary, designated with the same reference numeral provided with an accent.

The structure of device 51 is based on the same principle as the device 18 according to FIG. 5, be it of course that the actual heat exchanger unit consisting of a number of heat exchangers 14 is constructed in the manner of a number of tore or less radial spokes. The construction and operation of the device 51 will be apparent after the discussion of FIG. 12 and FIG. 5. Attention is drawn to the fact that through the construction of the heat exchangers 14, which anyway form the basis of device 51, the positions of the media outlets 22' and 24' are switched relative to those in device 44 according to FIG. 12.

Figure 14:
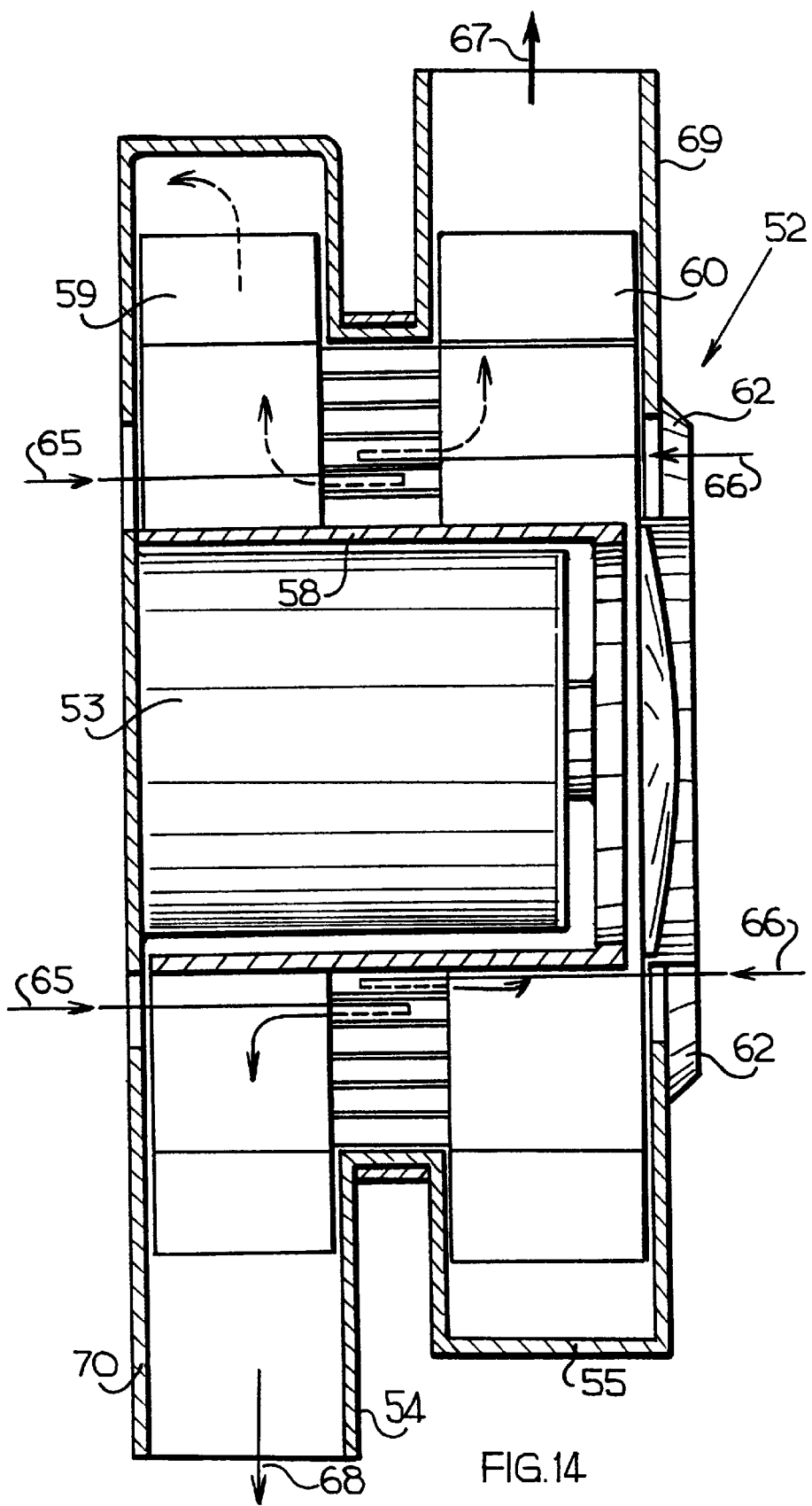
FIG. 14 is a cross section through a rotatably drivable heat exchanger in a further embodiment.
Figure 15:
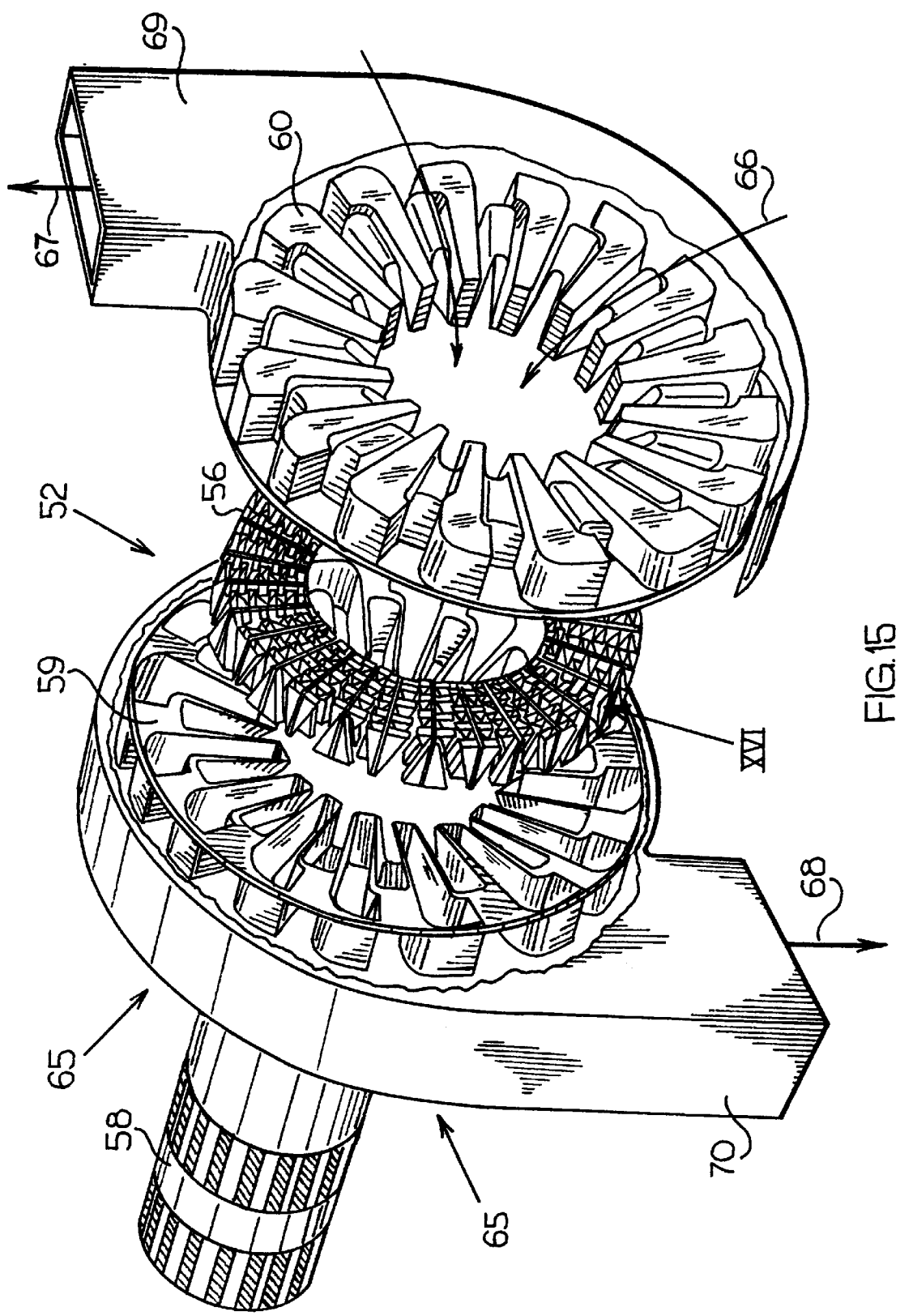
FIG. 15 shows an exploded view of the heat exchanger of FIG. 14.
Figure 16:
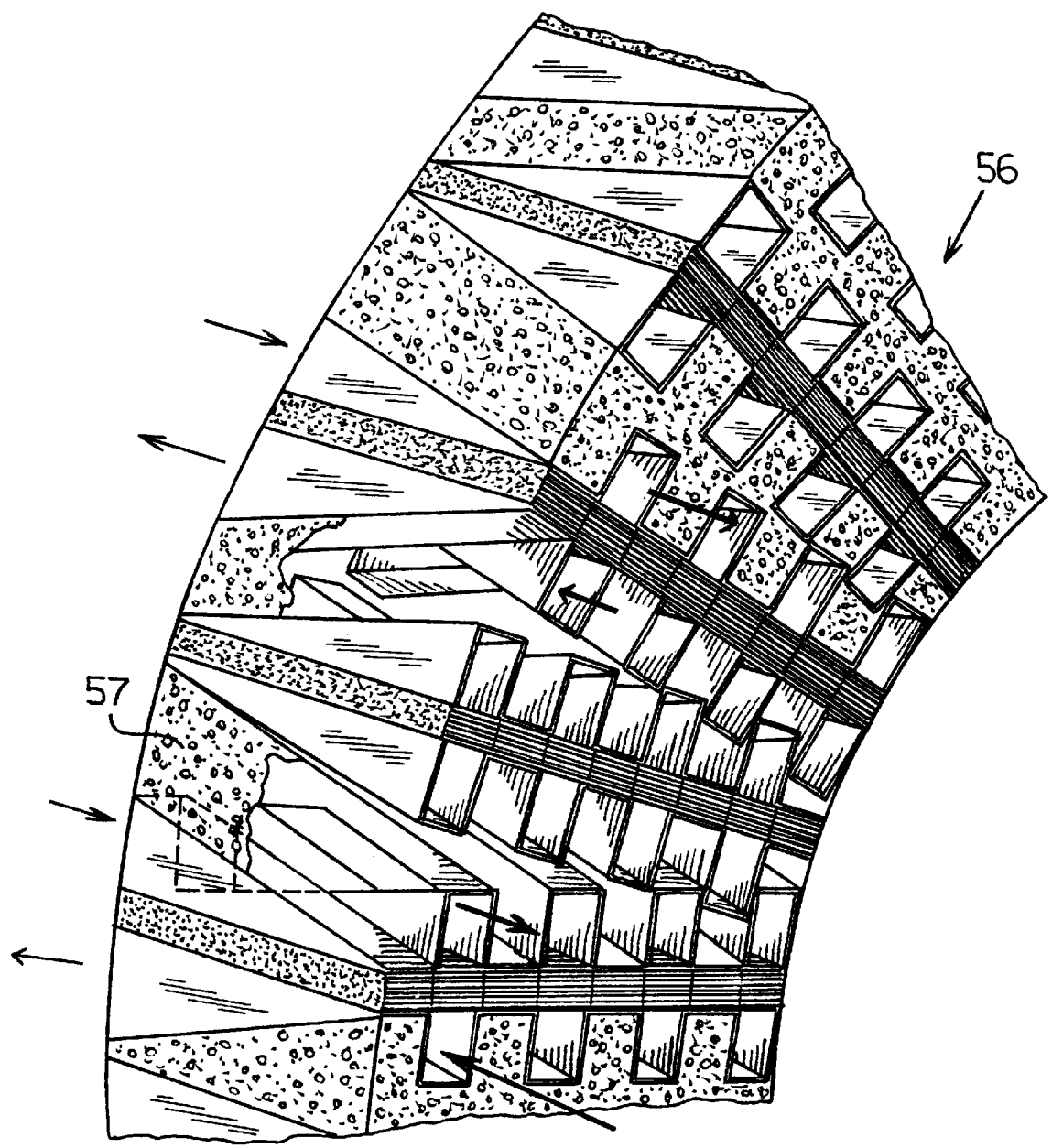
FIG. 16 shows the detail XVI of FIG. 15 on larger scale.

FIGS. 14, 15 and 16 show a rotatably drivable heat exchanger 52. This is related to the heat exchangers shown in FIGS. 12 and 13. The heat exchanger in the narrow sense is based on the structure shown in FIG. 10.

The rotor 53 is rotatable in a housing assembled from two parts 54, 55 and comprises a heat exchanger in the narrow sense which is designated with 56 and is constructed from a number of elements corresponding with FIG. 10. These elements are mutually separated in the manner shown in FIG. 16 by an insulation mass 57, in this case consisting of PUR-foam.

The rotor 53 comprises an "Aussenlaufer" motor 58 and two mirror-symmetrically formed and disposed medium-guiding blade bodies 59, 60. These are accommodated rotatably in the parts 54, 55 of the housing. The motor 58 is, as FIGS. 14 and 15 show, accommodated centrally in rotor 53.

Spokes 61, 62 leave openings free for feed of, in this case, a comparatively hot medium 65, respectively a cold medium 66. Thus are defined central intakes for the media for placing in heat exchanging contact.

The bodies 59 and 60 are connected to the motor 58. The annular heat exchanger 56 in the restricted sense extends between the bodies 59 and 60.

The arrows 66 which designate the cold medium are drawn without shading while arrows 65 which designate the relatively hot medium are drawn shaded black. It will be apparent that when medium flows through heat exchanger 56 a temperature change occurs. The inflowing cold medium 66, particularly air, will for instance be heated by the heat exchanger 56 due to heat exchanging contact and flows to the outside as comparatively heated air 67.

The relatively hot medium 67, for instance air, is cooled in the heat exchanger 56 and flows to the outside as cooled medium 68.

The medium 67 flows to the outside via an outlet 69 forming part of the housing part 55, while medium 68 flows to the outside via a second outlet 70 forming part of the housing part 54.

Attention is drawn to the fact that heat exchanger 56 in FIG. 15 is drawn without the PUR insulation mass. This gives a better insight into the spatial structure.

Figure 17:
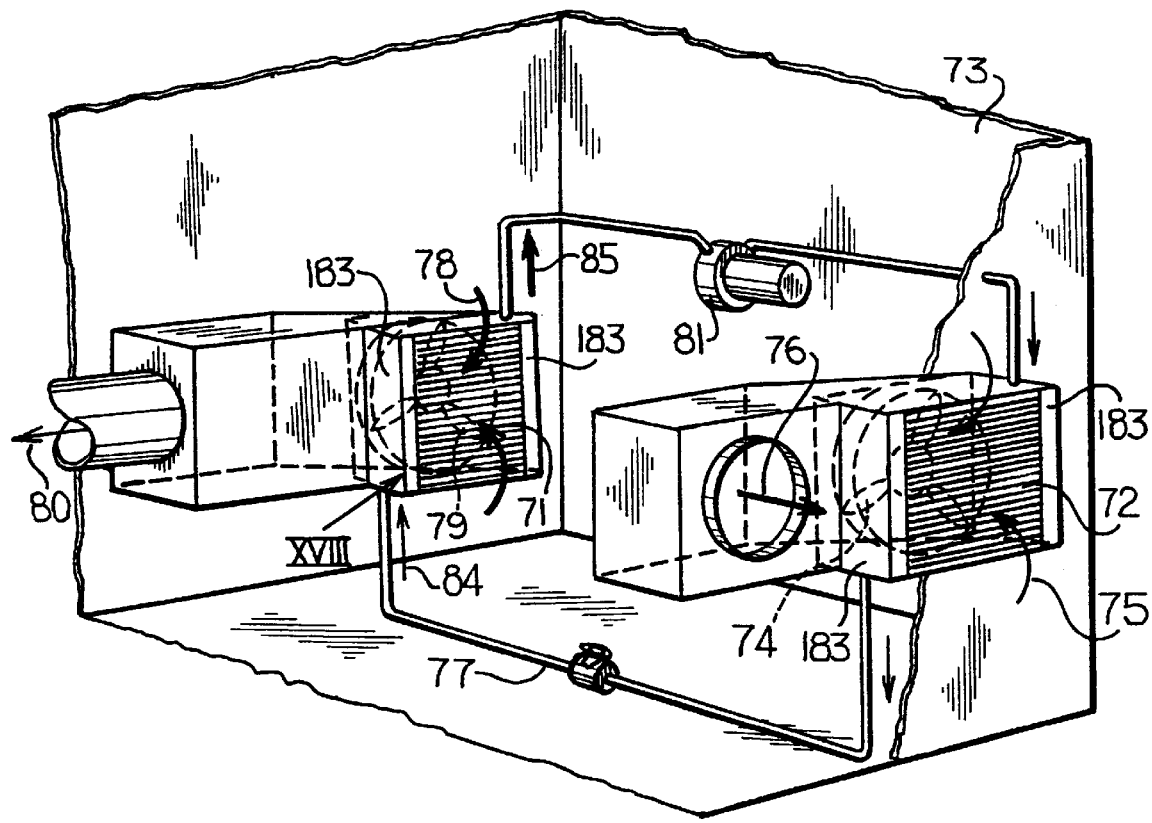
FIG. 17 shows a schematic perspective view of a device wherein two heat exchangers according to the invention are applied as heat pump.

FIG. 17 shows the construction of a heat pump with two heat exchangers 71, 72 according to the invention. The heat pump according to FIG. 17 comprises a heat exchanger placed outside a space 73 for cooling and through which relatively cool outside air is drawn in by means of a fan 75. Due to heating via heat exchanger 72 relatively hot air 76 is discharged again to the outside Via a conduit 77 a heat exchanging medium such as butane, propane, a CFC or the like is carried to the second heat exchanger 71. Relatively hot air 78 coming from the space is transported via fan 79 through the heat exchanger 71 where it is cooled. This cooled air 80 is blown again into the space 73. The heated heat-transporting medium is returned via a pump 81 to the heat exchanger 72. The heat exchanging medium is thus pumped round in a closed circuit in which both heat exchangers 71, 72 are included.

This description of the heat pump according to FIG. 17 is that of a usual cooling system.

It will be apparent that this heat pump can also be deployed for space heating by reversing the flow direction of the heat exchanging medium.

Figure 18:
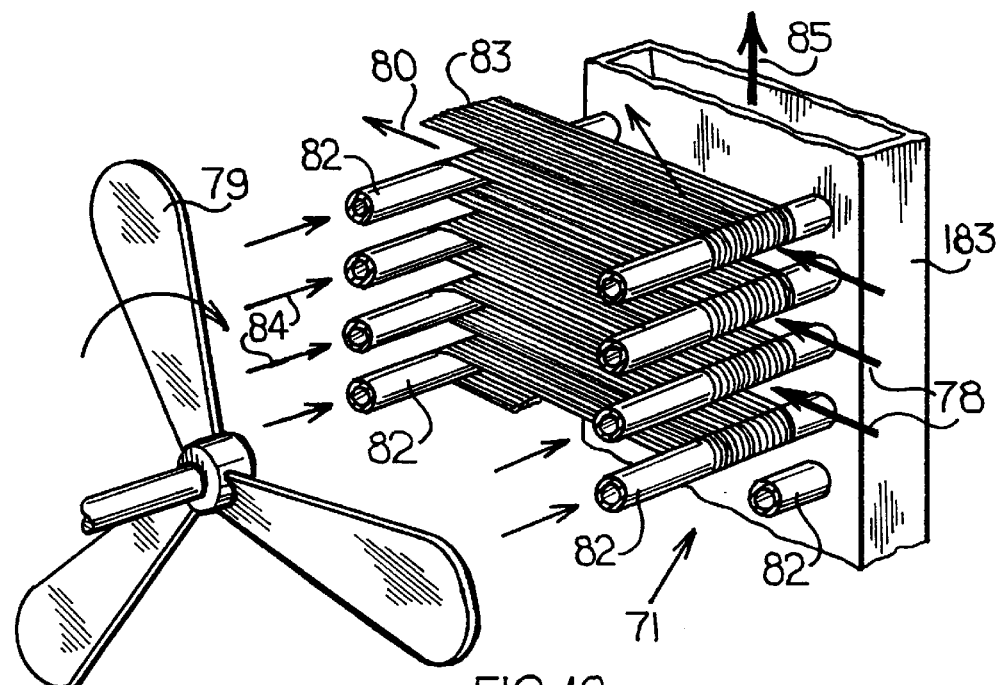
FIG. 18 shows the detail XVIII of FIG. 17.

FIG. 18 however shows the construction of the heat exchangers with reference to the detail XVIII of FIG. 17. Heat exchangers 71, 72 each comprise two connecting blocks or manifolds 82, 183 which are connected by the tubes 82 through which heat exchanging medium can flow. These tubes have a wall of material such as aluminium or copper which is a strong conductor of the heat. The thermally conducting wires 83 according to the invention are arranged in zigzag manner round the tubes. The relatively cool heat exchanging medium is designated with 84, while the heated medium is designated with 85. The free length of the wires through which the gaseous medium, such as air, can flow preferably lies in the order of magnitude of 6 mm.

It is generally recommended to embody the heat exchanger according to the invention such that the free length of the wires corresponding with the transverse dimension of the path of at least one of the media amounts to roughly 6 mm with a tolerance in the order of 2 mm.

I claim:

1. A heat exchanger comprising:
    a first space through which a first medium can flow along a first path;
    a second space through which a second medium can flow along a second path;
    heat conducting means which are in thermal contact with the first medium in the first space and the second medium in the second space for transferring heat therebetween;
    said heat conducting means including heat conducting wires which extend with mutual interspacing and in mutually parallel relation in a direction differing from the directions of the first and second path over at least a part of both transverse dimensions of the first space and the second space relative to said paths;
    said wires arranged in flat strips or mats which are placed such that at least one of said media flows first between the strips or mats and then through the strips or mats and between the wires with heat exchange between that medium and the wires.

2. The heat exchange as claimed in claim 1, wherein the pitch of the heat conducting wires is substantially twice the wire diameter.

3. The heat exchanger as claimed in claim 1, wherein a pitch of the heat conducting wires is about 1.5–2.5 times a diameter of said wires.

4. The heat exchanger as claimed in claim 1, wherein the heat conducting wires include at least one of copper, aluminum graphitized carbon fibres or another material for conducting heat at least in lengthwise direction of the wires.

5. The heat exchanger as claimed in claim 4, wherein the heat conducting wires include copper or aluminum and have a diameter which is smaller than 0,25 mm.

6. The heat exchanger as claimed in claim 1, wherein a free length of the wires corresponding with a transverse dimension of the path of at least one of the media is about (6±2) mm.

7. The heat exchanger as claimed in claim 1, wherein the two media flow through the heat exchanger in counterflow;
    the two spaces are separated by a dividing wall including a plurality of spacer wires which hold the heat conducting wires at mutual distances and which are joined mutually and to the heat conducting wires by an adhesive and filler mass and are arranged such that they do not substantially obstruct through-flow of medium;
    the first space and the second space respectively include a plurality of first compartments arranged with mutual interspaces and a plurality of second compartments filling the said interspaces between the first compartments, wherein the heat conducting wires extend over the whole of the relevant dimension of the heat exchanger,
    the heat conducting wires are grouped with the spacer wires into an elongate mat and extend in longitudinal direction thereof,
    the first compartments occupy a first position relative to the main plane of the mat such that the first path extends transversely of the heat conducting wires;
    the second compartments occupy a second position relative to the main plane of the mat such that the second path extends transversely of the heat conducting wires;
    extending on one side of the mat is a first zigzag folded plate which forms relevant boundaries of the first and the second compartments;

extending on the other side of the mat is a second zigzag folded plate which forms relevant boundaries of the first and the second compartments; and the boundaries formed by the two plates form together with said dividing walls to define side boundary walls of the compartments.

8. The heat exchanger as claimed in claim 7, wherein the adhesive and filler mass comprises a glue.

9. The heat exchanger as claimed in claim 7, wherein the adhesive and filler mass comprises a solder mass.

10. A heat exchanger as claimed in claim 7, wherein the spacer wires have substantially the same diameter as the heat conducting wires.

11. The heat exchanger as claimed in claim 10, wherein the first position and the second position are symmetrical relative to a main plane of the mat.

12. The heat exchanger as claimed in claim 11, wherein the plates are formed from a straight strip of plate material.

13. The heat exchanger as claimed in claim 10, wherein each compartment has a section perpendicular of the main plane of the mat having the general shape of a quadrilateral of which the mat is a diagonal.

14. The heat exchanger as claimed in claim 11, wherein the plates are folded such that they are nestable with the plates of a similar heat exchanger.

15. The heat exchanger as claimed in claim 13, wherein each path forms an angle with the mat, tangent of which amounts to at least about 0,2.

16. The heat exchanger as claimed in claim 10, wherein on at least one of the spaces, a fibrous second mat connects to the mat of heat conducting wires, which fibrous second mat serves to draw off condensation by capillary action from an underside of the mat of heat conducting wires.

17. The heat exchanger as claimed in claim 7, wherein the mat includes at least one layer of heat conducting wires and at least one layer of spacer wires.

18. The heat exchanger as claimed in claim 17, including 5–10 layers of heat conducting wires.

19. The heat exchanger as claimed in claim 17, wherein the mat comprises wound heat conducting wires.

20. The heat exchanger as claimed in claim 7, wherein the dividing wall includes a moisture-permeability configuration.

21. The heat exchanger as claimed in claim 7, wherein the plates are plastic.

22. The heat exchanger as claimed in claim 7, wherein the plates are aluminium.

23. The heat exchanger as claimed in claim 7, wherein at least one of the first and second compartments has a width with a value which is proportional to the diameter of the heat conducting wires and root of their thermal conductivity.

24. The heat exchanger as claimed in claim 23, wherein the heat exchanger forms part of a rotor drivable by a motor such that two functions are combined, namely pumping of two media and the exchange of heat therebetween.

25. The heat exchanger as claimed in claim 24, wherein the motor is an external rotor type motor and is centrally arranged in the rotor.

26. The heat exchanger as claimed in claim 1, wherein effective passages of the two spaces correspond with determined physical properties of the first medium and second medium.

27. A method for manufacturing a heat exchanger for heat exchange between two media flows, comprising the steps of:

a) providing a strip which carries on both its longitudinal sides transverse protrusions which are located pair-wise at the same longitudinal positions, which pairs have preselected mutual distances or alternately the one and the other with two different distances;

b) providing a first zigzag folded plate with transverse zones having the same pitches as the protrusions, the transverse dimensions of which first plate correspond with the distance between the two rows of protrusions;

c) placing the plate between the protrusions such that the transverse zones thereof lie in register with the protrusions;

d) providing heat conducting wires;

e) providing spacer wires;

f) arranging alternately a layer of mutually spaced heat conducting wires, which extend in lengthwise direction of the plate, and a layer of mutually spaced spacer wires which are trained zigzag over the protrusions such that they display transversely extending zones having pitches corresponding with the pairs of protrusions, wherein at least at the position of the intersections of the heat conducting wires and the spacer wires and at the position of the transverse zones of the plate an adhesive and filler mass is arranged, and wherein the wires are arranged in flat strips or tats such that medium will flow first between the strips or mats and then through the strips or mats and between the wires to provide heat exchange between the medium and the wires;

g) providing a second zigzag folded plate with transverse zones having the same pitches as the protrusions, the transverse dimensions of which second plate correspond with the distance between the two rows of protrusions;

h) arranging the second plate against the last arranged layer of heat conducting wires in register with the first plate and the transverse zones of the spacer wires, wherein at least at the position of the transverse zones of the second plate an adhesive and filler mass is arranged;

i) causing the adhesive and filler mass to cure if necessary in order to obtain the coupling between the heat conducting wires, the spacer wires and the first and the second plate and to form the dividing walls; and j) removing the thus formed heat exchanger from the protrusions transversely of the strip.

28. The method as claimed in claim 27, further including the step of:

performing step a) such that the strip is drivable in circular and rotating manner to arrange the heat conducting wires by winding.

* * * * *

UNITED STATES PATENT AND TRADEMARK OFFICE
CERTIFICATE OF CORRECTION

PATENT NO. : 5,832,992
DATED : November 10, 1998
INVENTOR(S) : Eleonoor Van Andel It is certified that error appears in the above-identified patent and that said Letters Patent is hereby corrected as shown below:

Column 3 Line 41 delete "consist of" and insert --are--.

Column 4 Line 11 "sane" should read --same--.

Column 5 Line 13 "seen-that" should read --seen that--.

Column 6 Line 6 "sane" should read --same--.

Column 8 Line 42 "tore or less" should read --more or less--.

Column 9 Line 31 after "outside" insert period --.--.

Claim 2 Column 10 Line 18 "exchange" should read --exchanger--.

Claim 27 Column 12 Line 51 "tats" should read --mats--.

Signed and Sealed this

Twenty-first Day of September, 1999

Attest:

Q. TODD DICKINSON

*Attesting Officer*   *Acting Commissioner of Patents and Trademarks*